United States Patent
Naughton et al.

(10) Patent No.: US 10,033,866 B2
(45) Date of Patent: Jul. 24, 2018

(54) FACILITATION OF AN INTERNET PROTOCOL MULTIMEDIA PLATFORM

(71) Applicant: AT&T Intellectual Property I, L.P., Atlanta, GA (US)

(72) Inventors: Richard Naughton, Belle Mead, NJ (US); Maurice Scott Laster, Alpharetta, GA (US); Jesus Sarte, Freehold, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 91 days.

(21) Appl. No.: 15/048,228

(22) Filed: Feb. 19, 2016

(65) Prior Publication Data

US 2017/0244833 A1 Aug. 24, 2017

(51) Int. Cl.
| | |
|---|---|
| *H04W 76/10* | (2018.01) |
| *H04M 3/46* | (2006.01) |
| *H04W 40/02* | (2009.01) |
| *H04W 8/08* | (2009.01) |
| *H04L 29/06* | (2006.01) |
| *H04W 4/16* | (2009.01) |

(52) U.S. Cl.
CPC ........ *H04M 3/465* (2013.01); *H04L 65/1016* (2013.01); *H04W 4/16* (2013.01); *H04W 8/08* (2013.01); *H04W 40/02* (2013.01)

(58) Field of Classification Search
CPC .................. H04L 13/08; H04L 12/56; H04Q 2213/13282; H04J 2211/005; H04M 3/142; H04W 4/06; H04W 4/12; H04W 4/16; H04W 84/16
See application file for complete search history.

(56) References Cited

U.S. PATENT DOCUMENTS

| | | | | |
|---|---|---|---|---|
| 7,664,877 | B1* | 2/2010 | Sheth ................... | H04L 45/507 709/242 |
| 7,969,967 | B2* | 6/2011 | Douglas .............. | H04L 29/1216 370/352 |
| 8,520,667 | B2* | 8/2013 | Terpstra ................. | H04L 12/66 370/230 |
| 8,989,369 | B1 | 3/2015 | Asghari et al. | |
| 2008/0287148 | A1* | 11/2008 | Silver ..................... | H04L 51/38 455/466 |
| 2014/0169172 | A1 | 6/2014 | Hu et al. | |
| 2014/0254491 | A1* | 9/2014 | Lindholm ........... | H04L 65/1016 370/328 |
| 2014/0280987 | A1* | 9/2014 | Ezell ................... | H04L 65/1016 709/227 |
| 2014/0282903 | A1 | 9/2014 | Singh et al. | |
| 2014/0341366 | A1 | 11/2014 | Phelps et al. | |
| 2014/0359147 | A1 | 12/2014 | Roldan et al. | |
| 2015/0016600 | A1 | 1/2015 | Desai et al. | |

(Continued)

*Primary Examiner* — Mohamed Kamara
(74) *Attorney, Agent, or Firm* — Amin, Turocy & Watson, LLP

(57) ABSTRACT

A call routing platform system can be used to facilitate routing of a call to a mobile device and a real-time communication API enable device simultaneously. A mobile device number associated with a mobile device can be registered with a call routing service to facilitate call forking between the mobile device and the real-time communication API enabled device. The call routing platform system can comprise an IP multimedia system to facilitate the call forking.

20 Claims, 12 Drawing Sheets

(56) References Cited

U.S. PATENT DOCUMENTS

| | | |
|---|---|---|
| 2015/0019746 A1 | 1/2015 | Shatzkamer et al. |
| 2015/0063172 A1 | 3/2015 | Taylor |
| 2015/0078263 A1 | 3/2015 | Mandyam et al. |
| 2015/0156804 A1 | 6/2015 | Lehtonen |
| 2015/0172879 A1 | 6/2015 | Vaidya et al. |
| 2015/0188843 A1 | 7/2015 | Chauhan et al. |
| 2015/0304364 A1 | 10/2015 | Wang et al. |
| 2015/0304934 A1* | 10/2015 | Malatack .............. H04L 45/745 455/552.1 |
| 2015/0326723 A1 | 11/2015 | Mezhibovsky et al. |

* cited by examiner

US 10,033,866 B2

FACILITATION OF AN INTERNET PROTOCOL MULTIMEDIA PLATFORM

TECHNICAL FIELD

This disclosure relates generally to facilitating mobile device terminal reception. More specifically, this disclosure relates to call routing within a mobility network.

BACKGROUND

In telecommunications, call management is the process of designing and implementing rules and parameters governing the routing of inbound telephone calls through a network. These rules can specify how calls are distributed according to the time and/or date of the call as well as the location of the caller (usually defined by an outbound caller identification). Call management can also involve the use of calling features such as call queues, interactive voice response menus, line hunting, and recorded announcements to provide a customized experience for the caller and can maximize the efficiency of inbound call handling.

Call management can be performed on varying degrees, from an individual screening unwanted calls from a residential landline to an international call carrier routing calls to different worldwide locations by percentage. Systems for governing call management can be in the form of hardware, such as a private branch exchange (PBX) telephone system attached to an integrated services digital network (ISDN) or a hosted software-based system. The automatic call distributor can also provide other information to the called party.

The above-described background relating to a call routing is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
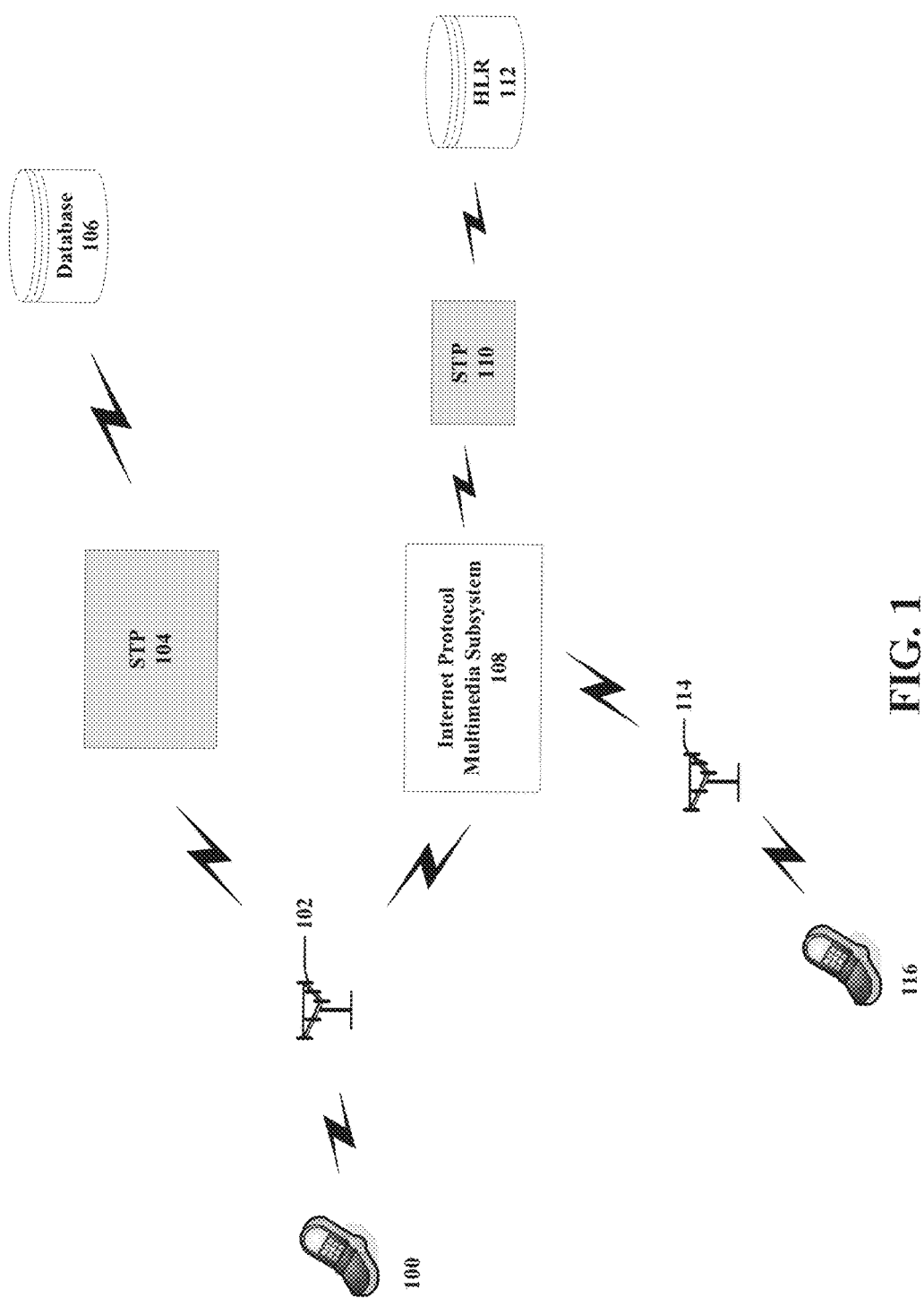
FIG. 1 illustrates an example wireless network comprising an internet protocol multimedia platform configuration according to one or more embodiments.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview of the various embodiments presented herein, to correct for the above-identified deficiencies and other drawbacks of traditional cellular mobility management, various embodiments are described herein to facilitate a seamless call routing between mobile devices and network devices.

For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It is noted that although various aspects and embodiments are discussed herein with respect to Universal Mobile Telecommunications System (UMTS) and/or Long Term Evolution (LTE), the disclosed aspects are not limited to a UMTS implementation and/or an LTE implementation. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate call routing. Facilitating call routing can be implemented in connection with any type of device with a connection to the communications network such as: a mobile handset, a computer, a handheld device, or the like.

An existing mobile number can serve as a real-time communication application program interface (API) identity for a customer, which can then allow the customer to receive mobile services via a real-time communication API enabled device as if it were a duplicate mobile device. Real time communication applications can be any application including, but not limited to, applications for video calling, voice chat, peer-to-peer file sharing, etc. The current disclosure can function in a pre-voice over long-term evolution (VOLTE) 3G environment. A subscriber to a call routing platform can have a mobility number associated with any mobile service architecture (MSA). When another mobile device, which can be located anywhere, calls the subscriber, the call can be terminated at the subscriber's mobile device and/or a real time communication API device of the subscriber, such as a laptop. The originating mobile device need not be a subscriber to the same mobile service provider, or the call routing platform, as the mobile device of the terminating line.

For instance, a customer of another wireline service provider located anywhere can call the subscriber located anywhere, thus invoking the call routing platform. The subscriber can also initiate calls from the real-time communication API device using the mobility number as the outgoing call identity. The real-time communication API originating identity can be controlled by an internet protocol (IP) multimedia system. Call forking/partitioning can be performed by the IP multimedia system. Web-to-web calls can also be made using the mobility number.

To begin the process, a call from an originating mobile device can be placed to terminal mobile number. The call can be routed to a global mobile switching center (GMSC). The GMSC can have translations updated to support a signaling system number 7 (SS7) mobile terminated (MT) query, via a signal transfer point (STP) that can be performed against a database containing mobile numbers that subscribe to the service platform. If the mobile number is found within the database, then the query can return routing data to the MSC or GMSC.

Routing in regional MSCs can be updated to reflect the availability of media gateway control function (MGCF) clusters that have been activated. The steering digits, or routing data, associated with directing calls to the IP multimedia system can be defined by the regional MSCs. The IP multimedia system can establish connectivity to the regional MGCFs via a voice over IP (VOIP) aware network (VAN) and/or a virtual private network (VPN) link. The VAN/VPN link can be a pre-requisite for activating the clusters to send service routing data to the IP multimedia system. The IP multimedia system can also route a mobility call to the MSC-MGCF that originated the call to the IP multimedia system by utilizing call forking data. The MSC-MGCF is a media gateway that can translate between session initiation protocol (SIP) and time-division multiplexing (TDM) signaling.

Local traffic originating in a regional MSC can use a local MGCF to transition to the IP multimedia system. Accordingly, routing in a national tandem number (NTN) network can be updated to reflect the availability of the MGCF clusters that have been activated. The MGCF clusters can be available to route local traffic to the IP multimedia system. Consequently, the regional MGCFs can establish a connection to the IP multimedia system via a consolidated VPN link. This link can be in place prior to MGCF cluster activation.

Route labels (RL) can comprise signal header data used to route call set-up data to the correct nodes in a network. The RLs can be nested RLs that allow for the insertion of a plurality of RLs. The RLs contained in nested RLs can also be existing RLs used to route to the MGCF enabled MSCs. When the nested RLs are queried, the policy server exchange (PSX) can identify and proportionally prioritize all routing options that are local to a gateway server from a vendor. One RL per network vendor location can be created unless the location has GMSC and NTN gateway servers. If GMSC and NTN gateway servers are collocated, then there can be two route labels created. The call routing platform RLs can be separate and distinct from VoLTE RLs. The call routing platform can include more than one MGCF destination in a RL. However, if multiple clusters exist in a location, all clusters can point to a single RL. GSMC clusters can point to the GMSC RL and NTN clusters can point to the NTN RL for the location. Routing can use exiting intra machine trunks (IMTs) between the network vendor and the MSC-MGCF, and the call setup can use existing integral services digital network user part (ISUP) configurations on the existing ISUP trunks, including settings related to voice-path, cut-through, and audible ringing related practices.

The call routing platform database can sit in the mobility SS7 network. The SS7 network can be updated to route SS7 MT queries to the call routing platform database prior to an SS7 database query to reference a home location register (HLR) associated with a subscriber's mobile station international subscriber directory number (MSISDN). This will allow the call routing platform database to be engaged to apply routing data for the call routing platform system subscribers. The call routing system database can screen calls coming into the mobility domain and match the call data to a phone number listed in the database. If the phone number is in the domain, then call handling can initiate special handling instructions via appending routing data to the MSISDNs that are identified as call routing system subscribers. The call routing system database can parse the number and then send the data over to the IP multimedia system. A Service Centralization and Continuity Application Server (SCC-AS) can have the ability to launch a send routing data (SRI) query to determine the mobile station routing number (MSRN) for the forked leg of the call that is sent back to the mobility network. This data can be included in the invite sent back to the MSC-MGCF.

The call routing system can also send a response comprising the routing data and the MSISDN to the node that performed the SRI/MT query (MSC or NTN). The IP multimedia system can support SS7/signal transport (SIGTRAN) links to the mobility network to support performing SRI queries to a mobility HLR. There can also be a direct interconnection between the real-time communication API platform to the mobility network. To account for existing subscribers within the network during network upgrades, the existing platform subscribers can be returned to their pre-subscriber state and/or migrated from a practical labs-SS7 multi-termination query (PL-SMQ) to the call routing database.

It should also be noted that an artificial intelligence (AI) component can facilitate automating one or more features in accordance with the disclosed aspects. A memory and a processor as well as other components can include functionality with regard to the figures. The disclosed aspects in connection with call routing can employ various AI-based schemes for carrying out various aspects thereof. For example, a process for detecting one or more trigger events, querying a database as a result of the one or more trigger events, and modifying one or more actions, and so forth, can be facilitated with an example automatic classifier system and process.

An example classifier can be a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that can be automatically performed. In the case of communication systems, for example, attributes can be a frequency band and a technology and the classes can be an output power reduction value. In another example, the attributes can be a frequency band, a technology, and the presence of an object and the classes can be an output power reduction value.

A support vector machine (SVM) is an example of a classifier that can be employed. The SVM can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed.

Classification as used herein also may be inclusive of statistical regression that is utilized to develop models of priority.

The disclosed aspects can employ classifiers that are explicitly trained (e.g., via a generic training data) as well as implicitly trained (e.g., via observing mobile device usage as it relates to triggering events, observing network frequency/technology, receiving extrinsic information, and so on). For example, SVMs can be configured via a learning or training phase within a classifier constructor and feature selection module. Thus, the classifier(s) can be used to automatically learn and perform a number of functions, including but not limited to modifying a transmit power, modifying one or more call routing measurements, and so forth. The criteria can include, but is not limited to, predefined values, frequency attenuation tables or other parameters, service provider preferences and/or policies, and so on.

In one embodiment, described herein is a method comprising receiving call data and call routing data associated with a call to a terminal device and performing a query. Then, based on a first result of the querying, routing the call to the terminal device. Thereafter, a second query to the data store can be performed for call routing data; and based on a second result of the second querying, second routing the call to the network device hosting the web site based on the call routing data.

According to another embodiment, a system can facilitate receiving call data associated with a call to a terminal device, querying a data store for the call data, and in response to the querying, receiving call routing data associated with a path to a network device hosting a web site. Thereafter, first routing the call to the terminal device based on a condition associated with the querying and the call data being determined to have been satisfied; and second routing the call to the network device hosting the web site based on the call routing data.

According to yet another embodiment, described herein is a machine-readable storage medium that can perform the operations comprising receiving call data associated with a call to a terminal device, querying a first data store for the call data, and in response to the querying, receiving call routing data associated with a path to a network device hosting a web site. The machine-readable storage medium can then facilitate querying a second data store for a subscriber identity related to the call routing data, and in response to a first condition associated with the querying the second data store being determined to have been satisfied, querying a third data store for location data related to the terminal device. Consequently, the machine-readable storage medium can first route the call to the terminal device based on a second condition associated with the querying the third data store being determined to have been satisfied, and second route the call to the network device hosting the web site based on the call routing data.

These and other embodiments or implementations are described in more detail below with reference to the drawings.

Referring now to FIG. 1, illustrated is an example wireless network comprising an internet protocol multimedia platform configuration according to one or more embodiments. A call can be initiated by a mobile device 100 to a terminal number associated with a terminal mobile device 116. To facilitate the call, call data can be sent to an MSC 102. The MSC 102 can then generate a SS7 query to request for routing information to STP 104. The STP 104 can then route, generate, and send an SS7 query related to the terminal number to a call routing system database 106. If the terminal number is found within the database, then the terminal mobile device is a subscriber to the call routing system and the query can return routing data back through the STP 104 to the MSC 102 or GMSC. The routing data can comprise a set of call steering digits to direct the call to the terminal device and/or an API device of the subscriber.

The MSC 102 can then forward the call to a media control gateway function (MCGF), which can then route the call to an IP multimedia system 108. The IP multimedia system 108 can fork/partition the call data according to the subscriber data found within the call routing system database. Web-to-web calls can also be made using the terminal number. The IP multimedia system 108 can then send the call data and the call routing data to an HLR database 112 to determine the location of the terminal mobile device 116. The terminal mobile device 116 location data can then be sent back to the IP multimedia system 108 via the STP 110. Consequently, the IP multimedia system 108 can send the call data to another MSC 114 located near the terminal device 116.

Figure 2:
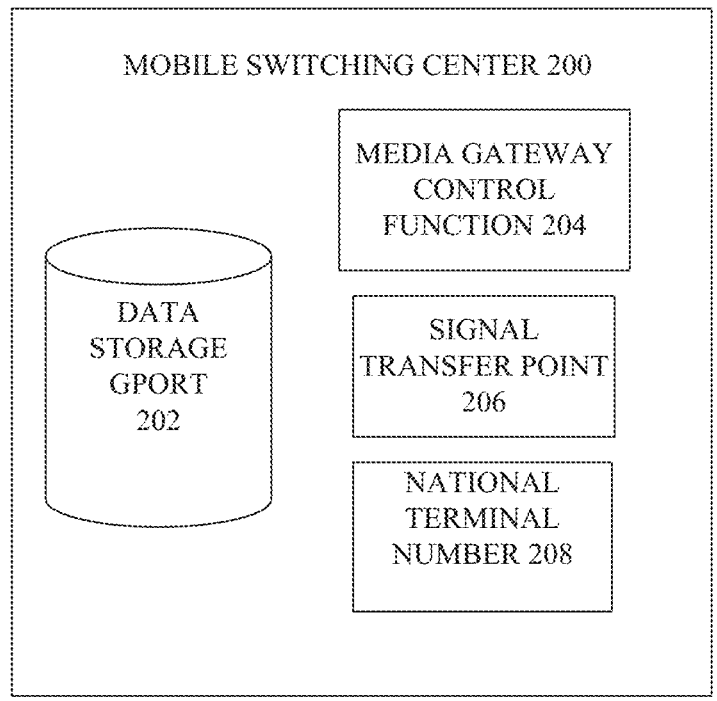
FIG. 2 illustrates an example wireless network mobility switching center according to one or more embodiments.

Referring now to FIG. 2, illustrated is an example wireless network mobility switching center according to one or more embodiments. Calls can be routed to the MSC 200 from a mobile device, a landline, an API device, or the like. An MSGF 204 of the MSC 200 can translate between SIP and TDM signaling via an STP function 206. The MSC can have translations updated to support an SS7 mobile terminated query, via an STP query that can be performed against the call routing system database containing mobile numbers that are subscribed to the service platform. If the mobile number is found within the database, then the query can return routing data to the MSC or GMSC. The MSC can comprise a media control MCGF 204 and can be configured to store data 202 related to the IP multimedia system, SS7 signaling data, national tandem number data 208, etc. The IP multimedia system can also route a mobility call, by utilizing call forking data, to the MSC 200, via the MGCF 204, that originated the call to the IP multimedia system.

Figure 3:
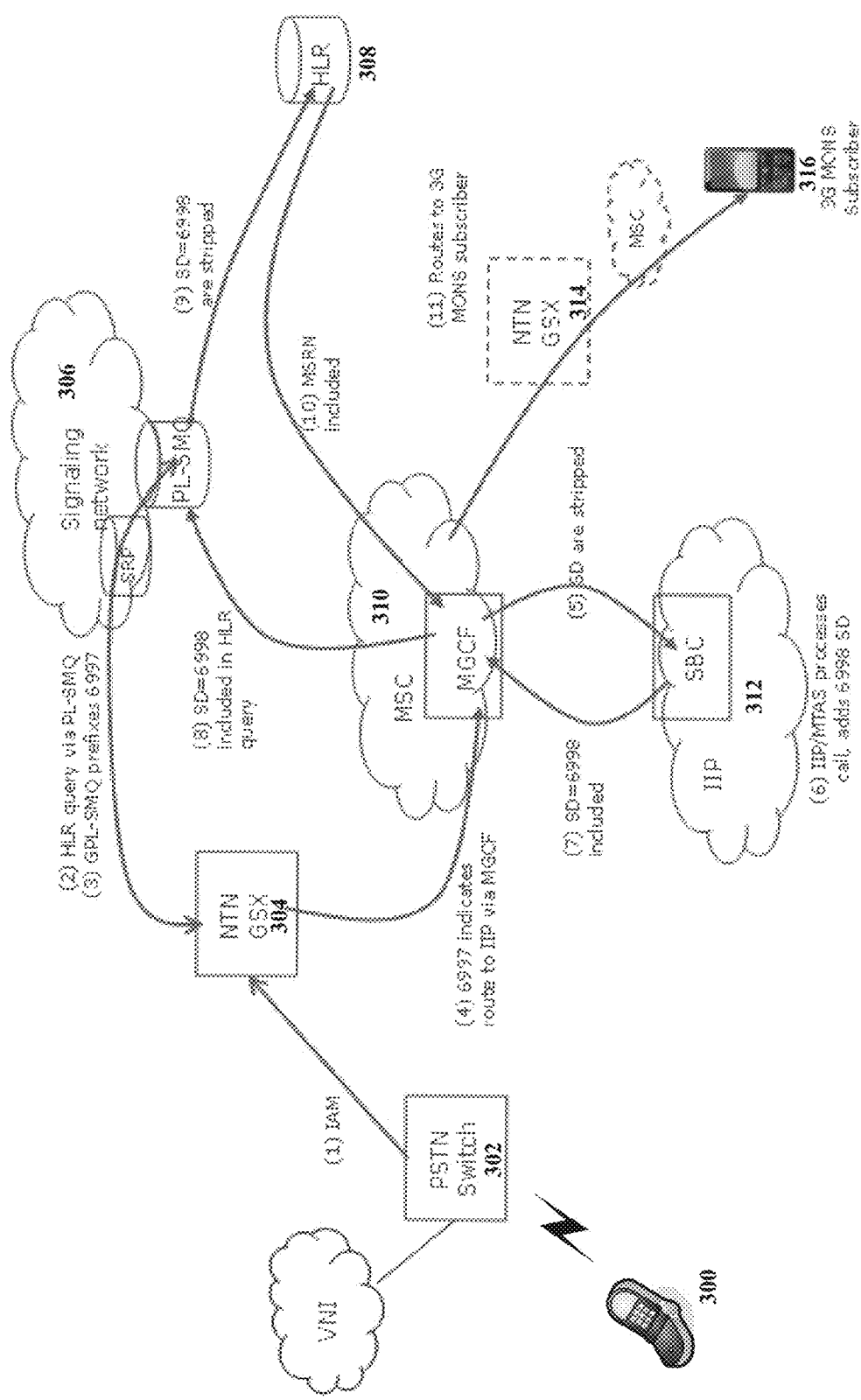
FIG. 3 illustrates an example public switched telephone network (PSTN)/business voice over internet protocol (BVoIP) calling a platform subscriber according to one or more embodiments.

Referring now to FIG. 3, illustrated is an example public switched telephone network (PSTN)/business voice over internet protocol (BVoIP) calling a platform subscriber according to one or more embodiments. An initiating mobile device 300 call can be routed to a gateway server 304 via the PSTN 302 over TDM trunks. The gateway server 304 can check the terminal number dialed from the initiating mobile device. If the gateway server 304 recognizes the terminal number, it can send a query to a HLR 308 to determine where user is located. The HLR 308 query can be routed through the signaling network 306 comprising an SRP and a PL-SMQ database. The STP of the signaling network 306 can then query SRP where an HLR ID for the call routing platform subscriber number points to the PL-SMQ database.

The PL-SMQ can therefore intercept the query, append routing data and respond back to the gateway server 304 via the signaling network 306. The gateway server 304 can interpret the appended routing data as indicating that the call must be routed to an IP multimedia system 312 and routes the call over TDM trunks to an MGCF enabled MSC 310 with connectivity to the IP multimedia system 312. The MGCF of the MSC can strip the appended routing data and send a SIP invite to the session border control SBC in the IP multimedia system 312. In an alternate embodiment the call can be routed across an NTN to another gateway server 314.

Thereafter, the SBC can send the call to an I-CSCF. The I-CSCF can send an LIR query to HSS. The HSS can determine if the number is a call routing platform subscriber number, wherein a location information answer (LIA)

response can comprise a serving call session control function (S-CSCF) to be used for the call.

The interrogating call session control function (I-CSCF) can send a SIP invite to the S-CSCF, which is based on an initial filter criteria (iFC) sending the call to a multimedia telephony application server (MTAS) for processing. The MTAS can receive the invite, process the call, determine that the call is destined to a call routing platform subscriber, and append the dialed number with call routing data in the SIP invite back to the S-CSCF. The S-CSCF can send an invite to the SBC, which forwards to the MGCF in the MSC. The MGCF can receive the SIP invite from the IP multimedia system 312 SBC with call routing data in the called party number and launches an HLR query with the full call routing data appended to the called number.

Global title translations (GTTs) in STP can send a query with appended call routing data to the PL-SMQ. Thus the PL-SMQ can intercept the query and interpret the appended call routing data as indicating that the query must be passed through to the HLR. The PL-SMQ can then strip the appended call routing data and pass the query to the HLR. The HLR can determine the MSRN for the MISDN and respond back to the MSC. The MSC can then route the call to the terminating device.

Figure 4:
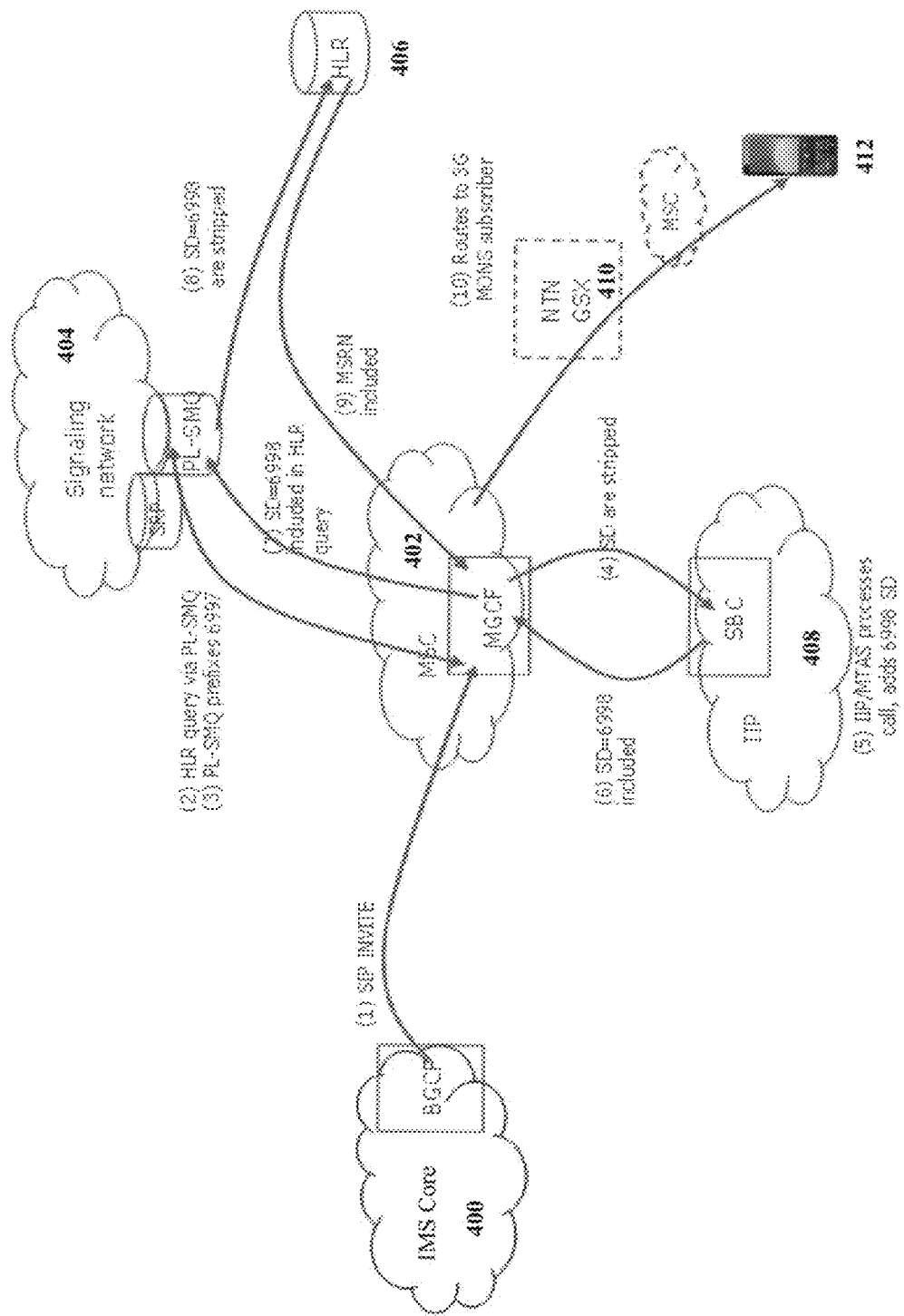
FIG. 4 illustrates an example Internet Protocol Multimedia System (IMS) user calling a platform subscriber according to one or more embodiments.

Referring now to FIG. 4, illustrated is an example universal service provider (USP) user calling a platform subscriber according to one or more embodiments. A user equipment device registered in the USP IMS network can call a call routing platform subscriber 412. After all originating processes are completed in the USP network, the S-CSCF can perform an E.164 number to uniform resource identifier mapping (ENUM) query. A negative response can cause the S-CSCF to send the call to a breakout gateway control function (BGCF) for routing off-net. The BGCF can send a SIP invite to an MGCF enabled MSC 402 that is in-region and associated with a called number. The MGCF can recognize the call data as being associated with a region code and launch an HLR 406 query. The HLR 406 query can be routed through the signaling network 404 comprising an SRP and a PL-SMQ database. The STP can query the SRP where an HLR ID for the call routing platform subscriber 412 number points to the PL-SMQ database.

The PL-SMQ can intercept the query, append call routing data, and respond back to MGCF 402 via the signaling network 404. The MGCF 402 can receive the response with the appended call routing data and the MSC/MGCF 402 can recognize that the appended call routing data indicates that the call needs to be routed towards the IP multimedia system 408. If the MSC/MGCF 402 has connectivity to the IP multimedia system 408, then the MGCF 402 can strip the appended call routing data and route the call to the IP multimedia system 408 SBC. If this MSC/MGCF 402 does not have connectivity to IIP, then the MSC 402 can either route the call via an NTN or route the call on an international mobile telecommunication (IMT) towards an MSC with IP multimedia system 408 connectivity. In both cases the steering digits remain intact. In an alternate embodiment the call can be routed across an NTN to another gateway server 410. Thereafter, the SBC in the IP multimedia system 408 can receive the SIP invite and forward it to the I-CSCF.

The I-CSCF can send an LIR query to HSS. The HSS can determine if the number is a call routing platform subscriber number and an LIA response can comprise the S-CSCF to be used for the call. The I-CSCF can send a SIP invite to the S-CSCF, which is based on an iFC sending the call to an MTAS for processing. The MTAS can receive the invite, process the call, determine that the call is destined to a call routing platform subscriber, and append the dialed number with call routing data in the SIP invite back to the S-CSCF. The S-CSCF can send an invite to the SBC, which the forwards the invite to the MGCF in the MSC. The MGCF can receive the SIP invite from the IP multimedia system 408 SBC with call routing data in the called party number and launch an HLR query with the full call routing data appended to the called number.

GTT translations in STP can send a query with appended call routing data to the PL-SMQ. Thus the PL-SMQ can intercept the query and recognize the appended call routing data as indicating that the query must be passed through to the HLR. The PL-SMQ then strip the appended call routing data and pass the query to the HLR. The HLR can determine the MSRN for the MISDN and respond back to the MSC. The MSC can then route the call to the terminating device.

Figure 5:
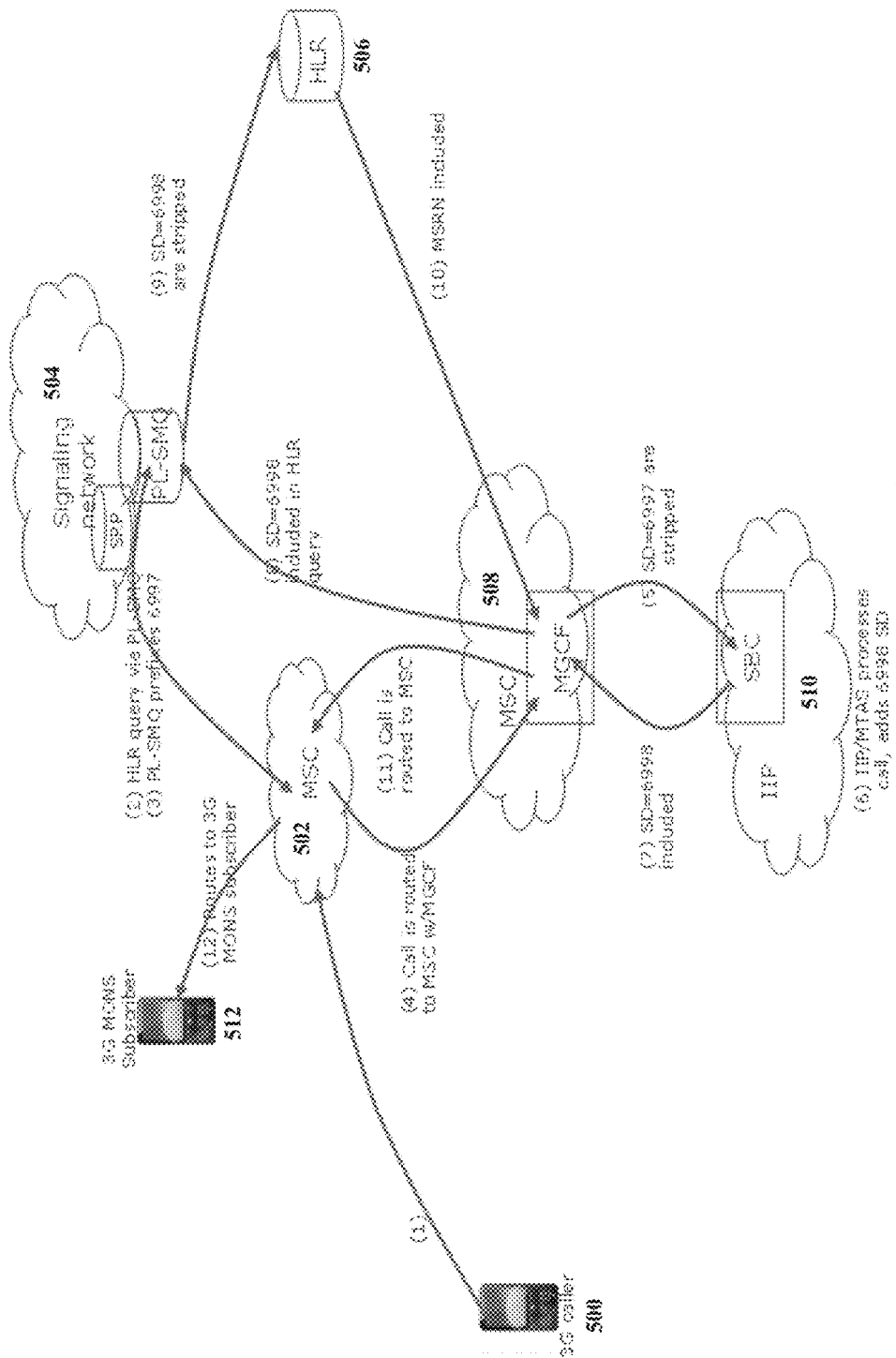
FIG. 5 illustrates an example user in the same region calling a platform subscriber according to one or more embodiments.

Referring now to FIG. 5, illustrated is an example user in the same region calling a platform subscriber according to one or more embodiments. A call initiating mobile device 500 can call a call routing platform subscriber 512 from within the same geographical region. The MSC 502 can recognize the regional code data and launch an HLR query. The HLR 506 query can be routed through the signaling network 504 comprising an SRP and a PL-SMQ database. The STP can query the SRP where an HLR ID for the call routing platform subscriber 512 number points to the PL-SMQ database. The PL-SMQ can intercept the query, append call routing data, and respond back to MSC/MGCF 508 via the signaling network 504. The MSC/MGCF 508 can receive the response with the appended call routing data and the MSC/MGCF 508 can recognize the appended call routing data, which indicates that the call needs to be routed towards the IP multimedia system 510. If the MSC/MGCF 508 has connectivity to the IP multimedia system 510, then the MGCF 502 can strip the appended call routing data and route the call to the IP multimedia system 510 SBC. Thereafter, the SBC in the IP multimedia system 510 can receive the SIP invite and forward it to the I-CSCF.

The I-CSCF can send an LIR query to HSS. The HSS can determine if the number is a call routing platform subscriber number, wherein an LIA response can comprise an S-CSCF to be used for the call. The I-CSCF can send a SIP invite to S-CSCF, which is based on an iFC sending the call to an MTAS for processing. The MTAS can receive the invite, process the call, determine that the call is destined to a call routing platform subscriber, and append the dialed number with call routing data in the SIP invite back to the S-CSCF. The S-CSCF can send an invite to the SBC, which then forwards to the MGCF in the MSC. The MGCF can receive the SIP invite from the IP multimedia system 510 SBC with call routing data in the called party number and launch an HLR query with the full call routing data appended to the called number.

GTT translations in STP can send a query with appended call routing data to the PL-SMQ. Thus the PL-SMQ can intercept the query and recognize the appended call routing data as indicating that the query must be passed through to the HLR. The PL-SMQ can then strip the appended call routing data and pass the query to the HLR. The HLR can determine the MSRN for the MISDN and respond back to the MSC. The MSC can then route the call to the terminating device.

Figure 6:
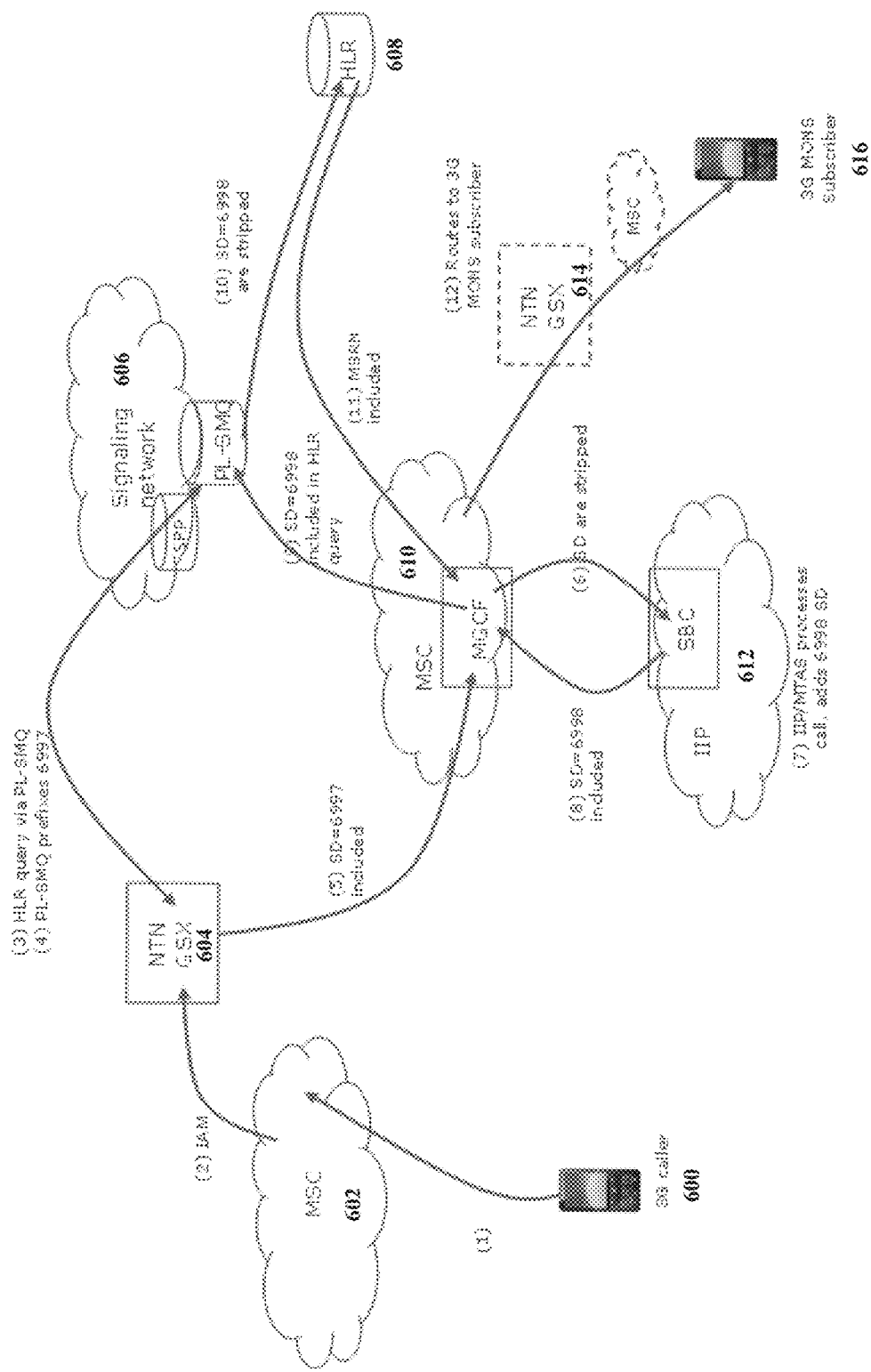
FIG. 6 illustrates an example a user in a different region calling a platform subscriber according to one or more embodiments.

Referring now to FIG. 6, illustrated is an example of a user in a different region calling a platform subscriber according to one or more embodiments. A call initiating device 600 can call a call routing platform subscriber 616 if the call initiating device is in a different MSC region than the call routing platform subscriber. The MSC 602 can recognize that the call routing platform subscriber 616 is out of region and routes the call to a gateway server 604. The gateway server 604 can check the dialed number associated with the call routing platform subscriber 616 and send a query to an HLR 608 to determine where the platform subscriber 616 is located. The HLR 608 query can be routed through the signaling network 606 comprising an SRP and a PL-SMQ database.

The STP can query the SRP where an HLR ID for the call routing platform subscriber 616 number points to the PL-SMQ database. The PL-SMQ can intercept the query, append call routing data, and respond back to network gateway 604 via the signaling network 606. The network gateway 604 can recognize the appended call route data as indicating that the call must be routed to the IP multimedia system 612 over TDM trunks via an MGCF enabled MSC 610 with connectivity to the IP multimedia system 612. In some cases, the call can be routed across an NTN to another network gateway 614. The MSC/MGCF 610 can receive the response with the appended call routing data and the MSC/MGCF 610 can recognize the appended call routing data, which indicates that the call needs to be routed towards the IP multimedia system 610. The MSC/MGCF 610 can strip the appended call routing data and send a SIP invite to the SBC in the IP multimedia system 610. The SBC can then send the call to an I-CSCF.

The I-CSCF can send an LIR query to HSS. The HSS can determine if the number is a call routing platform subscriber number, wherein the LIA response can comprise an S-CSCF to be used for the call. The I-CSCF can send a SIP invite to S-CSCF, which is based on an iFC sending the call to an MTAS for processing. The MTAS can receive the invite, process the call, determine that the call is destined for a call routing platform subscriber, and append the dialed number with call routing data in the SIP invite back to the S-CSCF. The S-CSCF can send an invite to the SBC, which then forwards the invite to the MGCF in the MSC. The MGCF can receive the SIP invite from the IP multimedia system 610 SBC with call routing data in the called party number and launch an HLR query with the full call routing data appended to the called number.

GTT translations in STP can send a query with appended call routing data to the PL-SMQ. Thus the PL-SMQ can intercept the query and recognize the appended call routing data as indicating that the query must be passed through to the HLR. The PL-SMQ can then strip the appended call routing data and pass the query to the HLR. The HLR can determine the MSRN for the MISDN and respond back to the MSC. The MSC can route the call to the terminating device.

Figure 7:
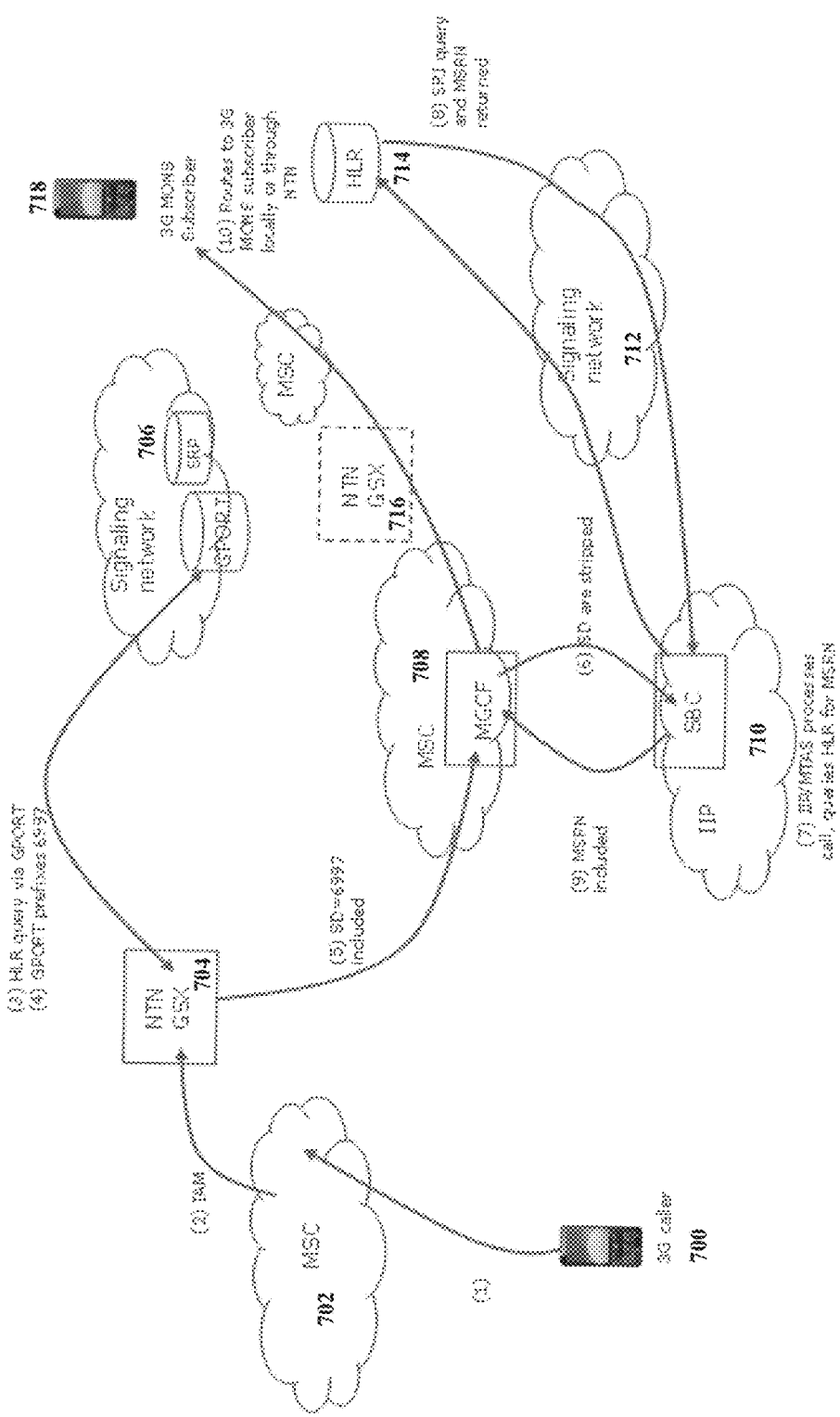
FIG. 7 illustrates an example platform routing using a parsing application according to one or more embodiments.

Referring now to FIG. 7, illustrated is an example platform routing using a parsing application according to one or more embodiments. A call can be processed using a call routing platform database and a send routing information (SRI) query from the IP multimedia platform to prevent a loop back. An MSC 702 can identify a call from an initiating mobile device 700 to a call routing platform subscriber device 718 that is in a different geographic region. The MSC 702 can then route the call to a network gateway server 704 where the network gateway server 704 can check the call terminating number associated with the call routing platform subscriber 718. If the network gateway server 704 identifies the call routing subscriber device 718 as being out of region, then the network gateway server 704 can query an HLR 714 to determine where the call routing platform subscriber device 718 is located.

The HLR 714 query can be routed through the signaling network 706 comprising a signal relay point (SRP) and the call routing platform database. The STP can query the SRP where the HLR 714 ID for the call routing platform subscriber number points to the call routing platform database. The call routing platform database can intercept the query, append call routing data, and respond back to network gateway server 704 via the signaling network 706. The network gateway server 704 can recognize the appended call route data as indicating that the call must be routed to the IP multimedia system 710 over TDM trunks via an MGCF enabled MSC 708 with connectivity to the IP multimedia system 710. In some cases, the call can be routed across an NTN to another network gateway 716. The MSC/MGCF 708 can receive the response with the appended call routing data and the MSC/MGCF 708 can recognize the appended call routing data, which indicates that the call needs to be routed towards the IP multimedia system 710. The MSC/MGCF 708 can strip the appended call routing data and send a SIP invite to the SBC in the IP multimedia system 710. The SBC can then send the call to an I-CSCF.

The I-CSCF can send an LIR query to HSS. The HSS can determine if the number is a call routing platform subscriber number wherein an LIA response can comprise an S-CSCF to be used for the call. The I-CSCF can send a SIP invite to S-CSCF, which is based on an iFC sending the call to an MTAS for processing. The MTAS can receive the invite, process the call, determine that the call is destined to a call routing platform subscriber, and perform an SRI query to the HLR 714. The HLR 714 can determine the MSRN for the MISDN and respond back to the MTAS. The MTAS can send a SIP invite with the MSRN back to the S-CSCF. The S-CSCF can then send the invite to the SBC, which can then forward the invite to the MGCF in MSC 708. The MGCF can receive the SIP invite from the IP multimedia system 710 SBC with the MSRN. The MSC can then route the call to the terminating device.

Figure 8:
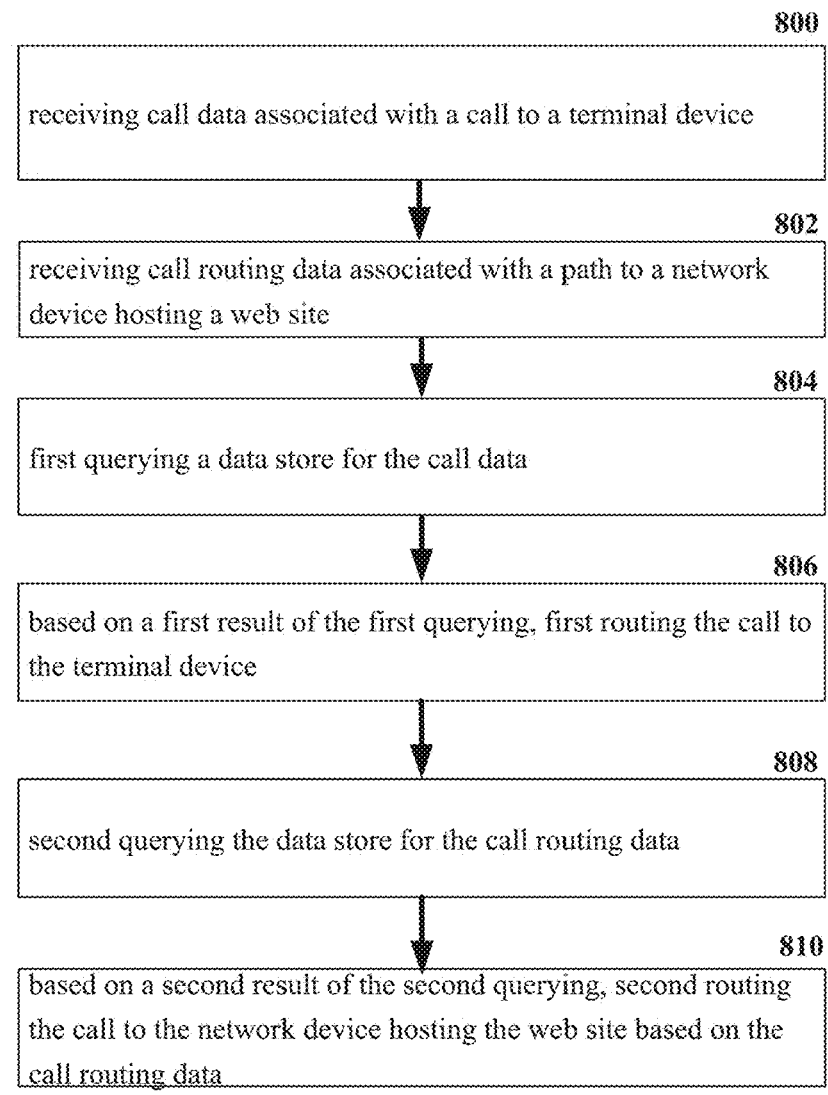
FIG. 8 illustrates an example schematic system block diagram for a method of call routing according to one or more embodiments.

Referring now to FIG. 8, illustrated is an example schematic system block diagram of a method for call routing according to one or more embodiments. At element 800 call data associated with a call to a terminal device can be received. Call routing data associated with a path to a network device hosting a web site can be received at element 802. The call routing data can be RLs comprising signal header data used to route call set-up data to nodes within a telecommunications network. The network device hosting the website can be a real-time communication API enabled device. A first querying a data store for the call data can be performed at element 804. The data store can be a call routing database associated with the call routing platform. Based on a first result of the first querying, at element 806, a first routing the call to the terminal device can be performed. At element 808, second querying the data store for the call routing data can be facilitated, and based on a second result of the second querying, a second routing of the call to the network device hosting the web site can be performed based on the call routing data at element 810. Consequently, the call can be simultaneously routed to a terminal device, which can be a mobile device, and a network device hosting a website, which can be a laptop.

Figure 9:
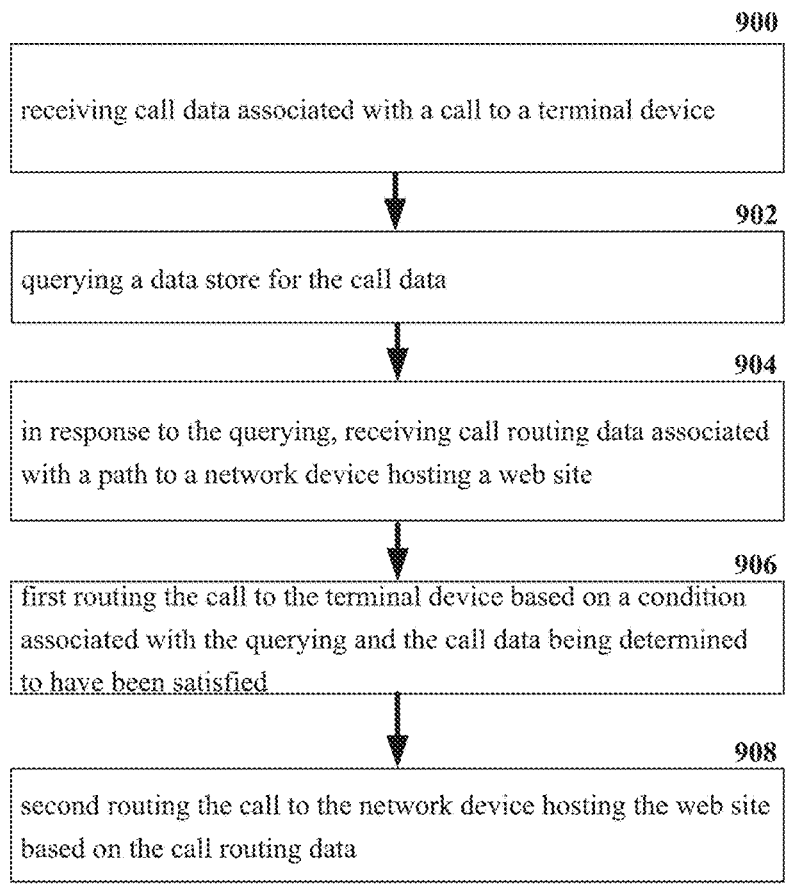
FIG. 9 illustrates an example schematic system block diagram of a system for call routing according to one or more embodiments.

Referring now to FIG. 9, illustrated is an example schematic system block diagram of a system for call routing according to one or more embodiments. At element 900, call data associated with a call to a terminal device can be received. At element 902, a data store can be queried for the call data, and in response to the querying, call routing data associated with a path to a network device hosting a web site can be received at element 904. The call routing data can be RLs comprising signal header data used to route call set-up data to nodes within a telecommunications network. The network device hosting the website can be a real-time communication API enabled device. At element 906, the call to the terminal device can be first routed based on a condition associated with the call data being determined to have been satisfied. The condition can be related to the querying, wherein the call data can be found within the call routing database of the call routing platform. Consequently, second routing the call to the network device hosting the web site based on the call routing data can be performed at element 908. The second routing can also be contingent upon the call data being found within the call routing database.

Figure 10:
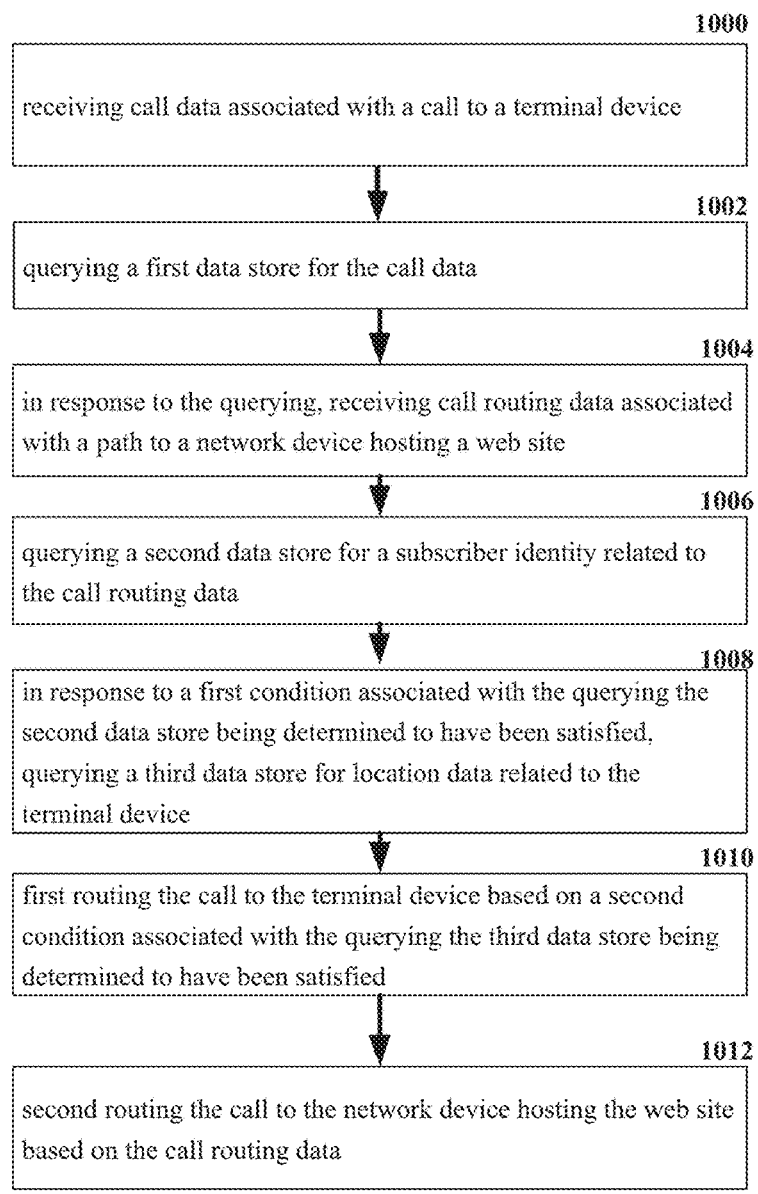
FIG. 10 illustrates an example schematic system block diagram for machine-readable medium to facilitate mobile device call routing according to one or more embodiments.

Referring now to FIG. 10, illustrated is an example schematic system block diagram for machine-readable medium to facilitate mobile device call routing according to one or more embodiments. At element 1000, call data associated with a call to a terminal device can be received, and at element 1002, a first data store can be queried for the call data. In response to the querying, at element 1004, call routing data associated with a path to a network device hosting a web site can be received. The call routing data can be RLs comprising signal header data used to route call set-up data to nodes within a telecommunications network. The network device hosting the website can be a real-time communication API enabled device. At element 1006, a second data store for a subscriber identity related to the call routing data can be queried. In response to a first condition associated with the querying the second data store being determined to have been satisfied, querying a third data store for location data related to the terminal device can be performed at element 1008. The third data store can comprise HLR data associated with the location of the terminal mobile device. Terminal mobile device location data can then be sent back to the IP multimedia system via the STP. Thus, first routing the call to the terminal device based on a second condition associated with the querying the third data store being determined to have been satisfied can be facilitated at element 1010. Accordingly, second routing the call to the network device hosting the web site, based on the call routing data, can be performed at element 1012.

Figure 11:
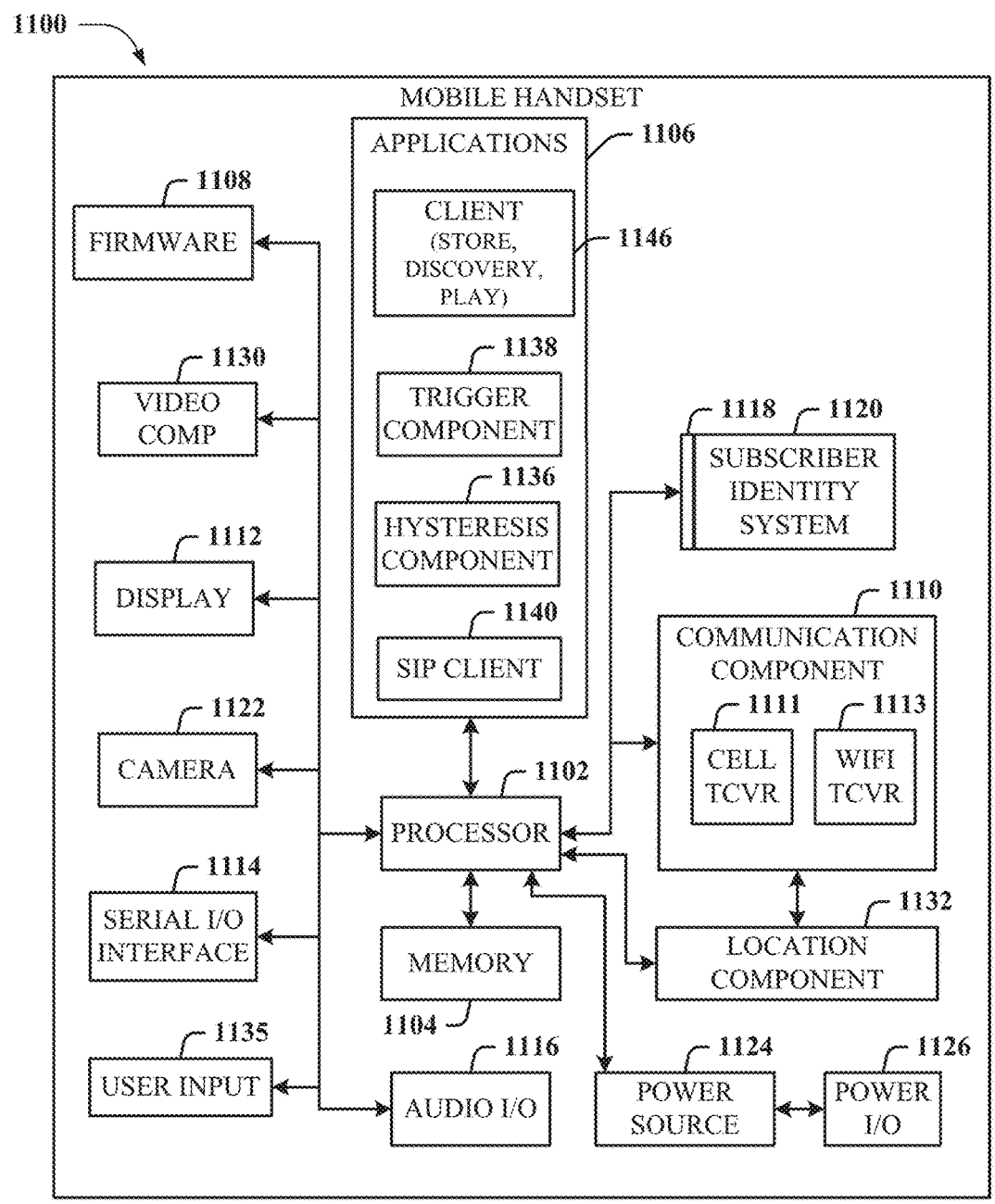
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
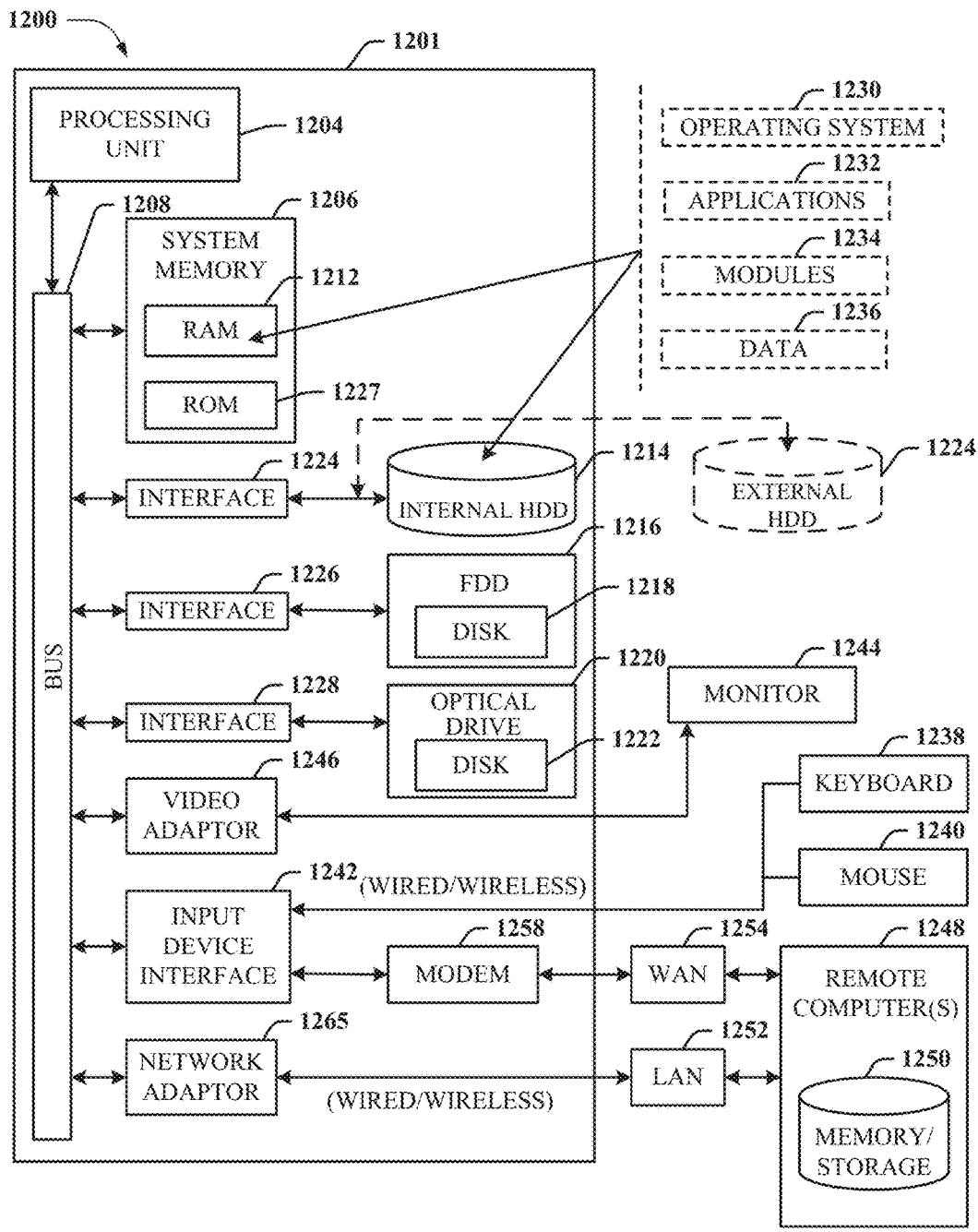
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    receiving, by a first network device comprising a processor, call data associated with a call to a terminal device;
    receiving, by the first network device, call routing data associated with a path to a second network device hosting a web site, wherein the call routing data comprises nested route label data representative of a nested route label for use in routing call set-up data to the second network device;
    first querying, by the first network device, a data store for the call data;
    based on a first result of the first querying, first routing, by the first network device, the call to the terminal device;
    second querying, by the first network device, the data store for the call routing data; and
    based on a second result of the second querying, second routing, by the first network device, the call to the second network device hosting the web site based on the call routing data.

2. The method of claim 1, wherein the first result indicates that the call data is in the data store.

3. The method of claim 2, wherein the second result indicates that the call routing data, associated with the path to the second network device, is in the data store.

4. The method of claim 1, wherein the second routing the call to the second network device hosting the web site comprises routing invite data related to an invite for the web site to accept the call.

5. The method of claim 1, wherein the first routing the call to the terminal device comprises routing invite data related to an invite for the terminal device to accept the call.

6. The method of claim 1, wherein the data store is a first data store, and wherein the receiving the call data comprises receiving the call data from a second data store configured to append the call routing data to the call data.

7. The method of claim 1, wherein the receiving the call data comprises receiving the call data from a local mobile switching center device.

8. A system, comprising:
    a processor; and
    a memory that stores executable instructions that, when executed by the processor, facilitate performance of operations, comprising:
    receiving call data associated with a call to a terminal device, wherein the call data comprises signal header data associated with a nested route label used in connection with routing call set-up data to the terminal device;
    querying a data store for the nested route label;
    in response to the querying, receiving call routing data associated with a path to a network device hosting a web site;
    based on a condition associated with the querying and the nested route label being determined to have been satisfied, first routing the call to the terminal device; and
    based on the call routing data, second routing the call to the network device hosting the web site.

9. The system of claim 8, wherein the call data comprises a phone number associated with the terminal device.

10. The system of claim 9, wherein the condition is related to phone number data being stored within the data store.

11. The system of claim 8, wherein the call routing data comprises a call routing number.

12. The system of claim 8, wherein the condition is related to the terminal device being registered for a service.

13. The system of claim 8, further comprising:
    receiving location data related to the terminal device from a home location register.

14. A non-transitory machine-readable storage medium, comprising executable instructions that, when executed by a processor, facilitate performance of operations, comprising:
    receiving call data associated with a call to a terminal device;
    querying a first data store for the call data;
    in response to the querying, receiving call routing data, wherein the call routing data comprises a nested route label associated with paths to a network device hosting a web site;
    querying a second data store for a subscriber identity related to the call routing data;
    in response to a first condition associated with the querying the second data store being determined to have been satisfied, querying a third data store for location data related to the terminal device;

based on a second condition associated with the querying the third data store being determined to have been satisfied, first routing the call to the terminal device; and based on the call routing data, second routing the call to the network device hosting the web site.

15. The non-transitory machine-readable storage medium of claim 14, wherein the third data store is a home location register.

16. The non-transitory machine-readable storage medium of claim 14, wherein the first condition is related to a verification of the subscriber identity.

17. The non-transitory machine-readable storage medium of claim 16, wherein the verification comprises verifying that the subscriber identity exists within the second data store.

18. The non-transitory machine-readable storage medium of claim 15, wherein the second routing the call to the network device hosting the web site comprises routing invite data related to an invite for the web site to accept the call.

19. The non-transitory machine-readable storage medium of claim 15, wherein the first routing the call to the terminal device comprises routing invite data related to an invite for the terminal device to accept the call.

20. The non-transitory machine-readable storage medium of claim 15, wherein the call routing data comprise a telephone number associated with the terminal device and a call routing number associated with the web site.

\* \* \* \* \*